Dec. 29, 1942.    F. GITS    2,306,876
KNOB STRUCTURE
Filed Dec. 5, 1940

Inventor
Frank Gits
By Thiess, Olson & Mecklenburger
Attys.

Patented Dec. 29, 1942

2,306,876

UNITED STATES PATENT OFFICE 2,306,876

KNOB STRUCTURE

Frank Gits, Chicago, Ill.

Application December 5, 1940, Serial No. 368,568

5 Claims. (Cl. 287—53)

This invention relates to knob construction and more particularly to a molded knob adapted to be mounted upon a spindle or shaft.

A molded knob is usually secured to a spindle or shaft by one of several forms of fastening means. The simplest form is a set screw. A set screw does not provide, however, a satisfactory attachment where it enters the molded material because the molded material wears and the threads provided to receive the set screw soon become ineffective to hold the set screw. When knobs are made of resinous materials, shrinkage marks tend to form upon the exterior surface and the cost of subsequent buffing and polishing makes it necessary to provide a design that will overcome this undesirable feature if possible. I have found in molding resinous materials that gas may form and thick walls or masses will trap this gas and form pockets that cause inward pulling or collapsing of the material when cooling. Thus, shrinkage marks will form on the exterior surface of the product. In the construction of knobs, however, thin walls restrict the size of a metallic insert or bushing that may be used to receive the spindle or shaft, and consequently, the wall thickness of the metallic insert will be insufficient to provide the necessary threads to hold the set screw firmly. Although larger bushings may be used, they are more expensive, heavier and require a bulkier knob construction that is also more costly and invariably leads to experiencing the shrinkage difficulties above described. I have found that no construction has been devised heretofore that permits the use of a set screw in connection with a metallic insert to secure a firm support for the screw and still provide a simple and inexpensive design capable of overcoming the above difficulties.

Accordingly, an object of the invention is to provide a molded knob of plastic material that is simple and inexpensive and employs a unique form of metallic insert that particularly lends itself to a novel type of wall construction wherein thin walls may be used to prevent the trapping of gas during the molding operation, the metallic insert providing a firm support for a set screw. The insert is of a design that particularly adapts itself to a knob construction that is simple and practical. The unit and its relation of parts advantageously overcome the difficulties heretofore experienced in prior art knobs.

Other objects and advantages of the invention will be apparent from the following detail description when taken in connection with the accompanying drawing, which form a part hereof.

Figure 1:
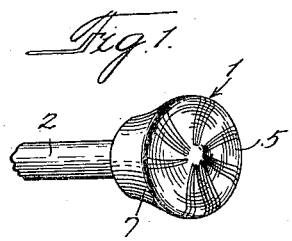
Figure 1 is a perspective view of a knob embodying the present invention.

One apt embodiment of the invention is illustrated in the drawing. The knob is of a type that may be used at the end of any suitable shaft. It may be used as a radial dial knob, a door knob, a knob for automobile radiator ornaments and gear shift levers, a knob forming ornamental tips on different structures, and for other analogous purposes.

Knob 1 may comprise a molded body of thermoplastic or thermosetting material, such as an artificial or synthetic resinous compound, having an opening or recess 3 to receive shaft 2, and means for holding the body upon the shaft, say by a set screw 11 that may lock the body to the shafts to present relative movement between the same. In Fig. 1, knob 1 is formed with a spherical face 5 on front wall 6 and an annular face 7 about side wall 8, which face 7 flares outwardly at the front to meet face 5, these faces being preferably smooth to permit the knob to be easily gripped and also to present an artistic appearance. It is quite desirable, therefore, that walls 6 and 8 be formed in the molding operation to eliminate a mass that will cause formation of gas pockets during the molding operation. Shrinkage marks upon face 5 would be undesirable and would necessitate buffing or polishing out operations that are relatively costly for an article of this character. Hence, recess 3 is formed to provide a construction of relatively thin walls so that, during the injection operation, the resinous material will not have an opportunity to trap any gas that may form.

This construction is obtained by making recess 3 of sufficient size to leave walls 6 and 8 of the minimum thickness required to provide the necessary strength for a device of this kind. A metallic insert 10 may then be provided in recess 3 and anchored against front wall 6 so as to receive the end of shaft 2 and also set screw 11 to lock the insert to this shaft. In order that insert 10 may be of minimum size so as to allow making walls 6 and 8 of the desired thinness to prevent shrinkage marks from forming on faces 5 and 7, this insert 10 may be in the form of a thin sleeve of a contour corresponding to the cross section of shaft 2 and have formed thereon a boss 12 that lies in recess 3, and, if so desired, extend short of touching wall 8, this boss 12 serving the purpose of providing an adequate mass into which set screw 11 may be threaded so as to secure a firm support for this screw. Thus, a metal to metal contact may be made between set screw 11 and insert 10 so that the screw will be firmly held.

I have shown the outer face 13 of boss 12 embedded at 14 in the plastic material to form a substantially solid continuation of wall 8 at this area. This continuation of wall 8 permits the use of an opening 15 provided in wall 8 for set screw 11 entering the threaded opening in boss 12 and also tends more firmly to anchor insert 10 against front wall 6. It is found that such anchoring may be essentially obtained by flowing a small amount of plastic material about insert 10 to form a thin shell 16 integral with wall 6. This shell does not add to the mass of plastic material in wall 6 to the extent of causing any difficulty in the molding of this wall that may result in shrinkage marks on face 5. Neither will the additional material at 14 between outer face 13 of insert 10 and wall 8 add to the mass of plastic material in said wall 8 so as to cause a like difficulty.

In the event insert 10 should in time tend to become loose and displace itself from the knob structure, a mechanical interlock may be provided in the form of a transverse groove 25 in the upper part of boss 12 near the end abutting the front wall 6. Boss 12 may also be cut away at 26. When insert 10 is placed in the die, the cavity wall forming the outer face of shell 16 may form shoulders 27 of plastic material on each side of boss 12 that are integral with the knob structure, the plastic material also flowing into groove 25 and above the cut-away portion 26 of boss 12. This provides a mechanical interlock for insert 10 that will positively prevent insert 10 freeing itself either axially or rotatively from the knob.

It will be noted that the construction disclosed also provides a metallic insert 10 of minimum mass although providing an adequate wall thickness at the point where this insert 10 receives set screw 11 so as to furnish a firm support therefor. Hence, a considerable saving in cost of material may be effected by reducing the amount of metal necessary for the insert and providing a simple knob construction of minimum wall thickness as well as a form of anchorage for the insert that likewise requires a minimum amount of material, the shell 16 and the material at 14 providing the same anchorage support for the insert as would be provided if the insert were completely embedded in walls of considerably greater thickness. As a result, an exceedingly simple dial knob is provided at a low cost. This dial knob is capable of giving better support to the set screw holding the same upon the shaft than devices as heretofore constructed. The plastic material is not used to provide the threads that cooperate with the threads of the set screw, and consequently, the threads in boss 12 will not wear by several movements of the set screw back and forth in its opening. A firm support will always be obtained.

Moreover, this dial knob is extremely simple to mold and does not require a number of subsequent operations to complete the securing means that must be provided in each case to hold the knob upon the shaft. A single tapping operation to provide opening 15 and the threaded hole in boss 12 is only necessary.

Figure 7:
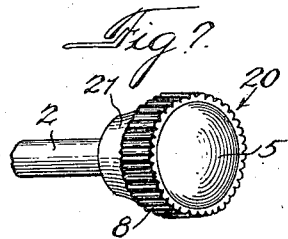
Fig. 7 is a perspective view of a slightly modified form of knob embodying the invention.
Figures 2, 3:
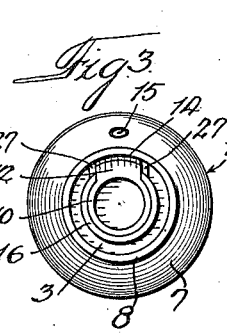
Fig. 2 is a vertical sectional view through this knob.
Fig. 3 is an end view of the knob omitting the shaft.
Figure 4:
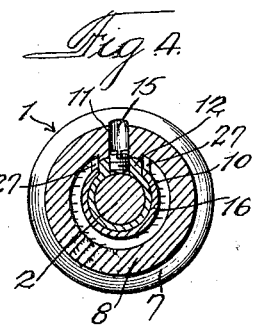
Fig. 4 is a transverse sectional view taken along line 4—4 of Fig. 2.
Figures 5, 8:
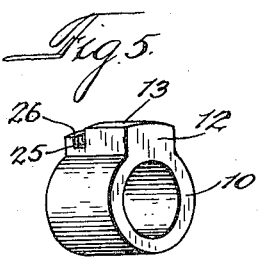
Fig. 5 is an enlarged detail view of the metallic insert.
Fig. 8 is a vertical sectional view of the same.
Figure 6:
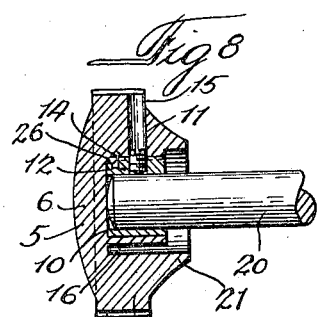
Fig. 6 is a perspective view partially in cross section to illustrate more fully the manner of carrying this insert in the knob.

Figs. 7 and 8 illustrate the ease of adaptation of metallic insert 10 to a knob 20 of slightly different design. Both front wall 5 and annular side wall 8 may be also be of uniform but minimum thickness so as to avoid the difficulty of shrinkage marks forming during the molding operation. The periphery of side wall 8 may be knurled as shown and have a skirt 21 extending rearwardly. Other designs of knobs may be used and employ the present invention equally as well. Hence, I do not intend to be limited to the design of knob to be used.

Without further elaboration, the foregoing will so fully explain the gist of my invention that others may, by applying current knowledge, readily adapt the same for use under varying conditions of service, without eliminating certain features, which may properly be said to constitute the essential items of novelty involved, which items are intended to be defined and secured to me by the following claims.

I claim:

1. A knob of the type adapted to be secured by a set screw to a shaft to rotate the shaft comprising a molded body of plastic material having a front wall and an annular side wall defining a central recess open at the rear of said body, a metallic insert seated in said recess against said front wall, a boss on said insert, a shell integrally formed with respect to said body extending about said insert to anchor said insert to said front wall, said boss extending through said shell, an integrally formed extension on said side wall embedding therein the outer face of said boss, said extension including shoulders on opposite sides of said boss, and a set screw entering said side wall and said boss, said boss being tapped to receive said set screw.

2. A knob of the type adapted to be secured by a set screw to a shaft to rotate the shaft comprising a molded body of plastic material having a centrally disposed recess open at one side of said body and into which recess said shaft is adapted to pass, a metallic insert in said recess for the reception of said shaft, a boss on said insert, and means for mechanically interlocking said metallic insert and said boss to said body to prevent either axial displacement or rotative movement of said insert with respect to said body, said insert and said boss being tapped to receive said set screw.

3. The combination with a molded body of plastic material adapted to be mounted upon a spindle, there being an opening in said body to receive said spindle, of means for holding said body upon said spindle comprising a metallic insert and a tapped boss for the reception of a set screw, said insert and boss being mechanically interlocked to said body to prevent either axial displacement or rotative movement of said insert with respect to said body, the wall of said body opposite said tap in said boss having an opening therein through which said set screw passes to enter said tap.

4. The combination with a molded body of plastic material adapted to be mounted upon a spindle, there being an opening in said body to receive said spindle, of means for holding said body upon said spindle comprising a metallic insert and a tapped boss on said insert for the reception of a set screw or like connecting member, the wall of said body opposite said tap in said boss being substantially solid and having an opening therein through which said set screw passes to enter said tap, and means on said boss and said body for mechanically interlocking said insert to said body to prevent axial or rotative displacement.

5. The combination with a molded body of plastic material adapted to be mounted upon a spindle, there being an opening in said body to receive said spindle, of means for holding said body upon said spindle comprising a metallic insert and a tapped boss for the reception of a set screw, said insert and boss being anchored to said body by being at least partially embedded in said plastic material, the wall of said body opposite said tap in said boss being substantially solid and having an opening therein through which said set screw passes to enter said tap, and means for mechanically interlocking said insert to said body to prevent axial or rotative displacement, said means comprising a transverse groove in said boss and shoulders integral with the material of said body on opposite sides of said boss, the material of said body between said shoulders lying in said transverse groove.

FRANK GITS.